Aug. 9, 1927.

H. R. WOODROW 1,638,024

ARC WELDING MACHINE

Filed June 18, 1919

6 Sheets-Sheet 5

Inventor
Harry R. Woodrow

By his Attorney

Aug. 9, 1927.

H. R. WOODROW 1,638,024

ARC WELDING MACHINE

Filed June 18, 1919 6 Sheets-Sheet 6

Inventor
Harry R. Woodrow
By his Attorney

Patented Aug. 9, 1927.

1,638,024

UNITED STATES PATENT OFFICE.

HARRY R. WOODROW, OF NEW YORK, N. Y., ASSIGNOR TO THOMAS E. MURRAY, OF NEW YORK, N. Y.

ARC-WELDING MACHINE.

Application filed June 18, 1919. Serial No. 305,089.

The invention is an automatic arc welding machine. The object is to provide a compact mechanism, embodying all sequences of operation, which in the existing state of the electric arc welding art are performed by a skilled operator, and to weld continuously any length of joint previously determined by the shape of the prospective welding object irrespective of the length of time required to complete the same. At the present time, this operation is mainly limited by the endurance and skill of the operator, and under normal conditions can seldom exceed an uninterrupted period of five minutes. The operation of arc welding is determined by three principal features, namely:

1st. The striking of the arc.

2nd. The uniform and continuous feeding of the pencil electrode toward the weld.

3rd. The stopping of the arc.

All of these in their proper order are automatically accomplished by the present machine, as will hereinafter appear.

The mode of organization is as follows: The objects to be welded are placed in registry and are rotated so that the joint is carried in front of a fusible electrode, which is here the end of a wire of fusible metal taken from a freely rotating reel. The welding arc is struck from the end of the wire, which is continuously fed as consumed to the joint between the juxtaposed objects to be welded. The wire as it is melted enters the joint, while at the same time the metal of the objects at the joint is rendered plastic by the arc, so that said objects and wire progressively become united until the entire joint is completed.

In the accompanying drawings—

Figure 1:
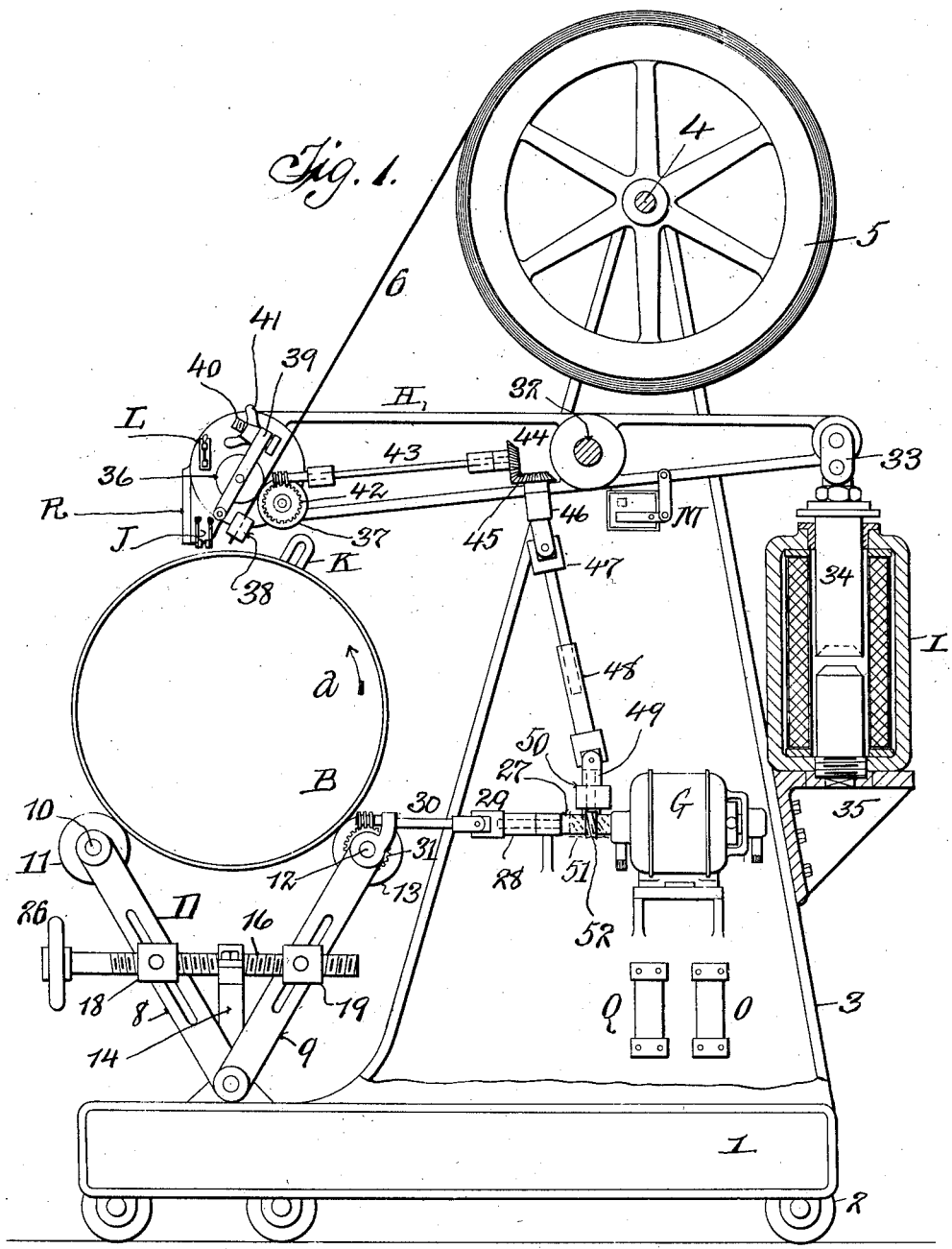
Figure 2:
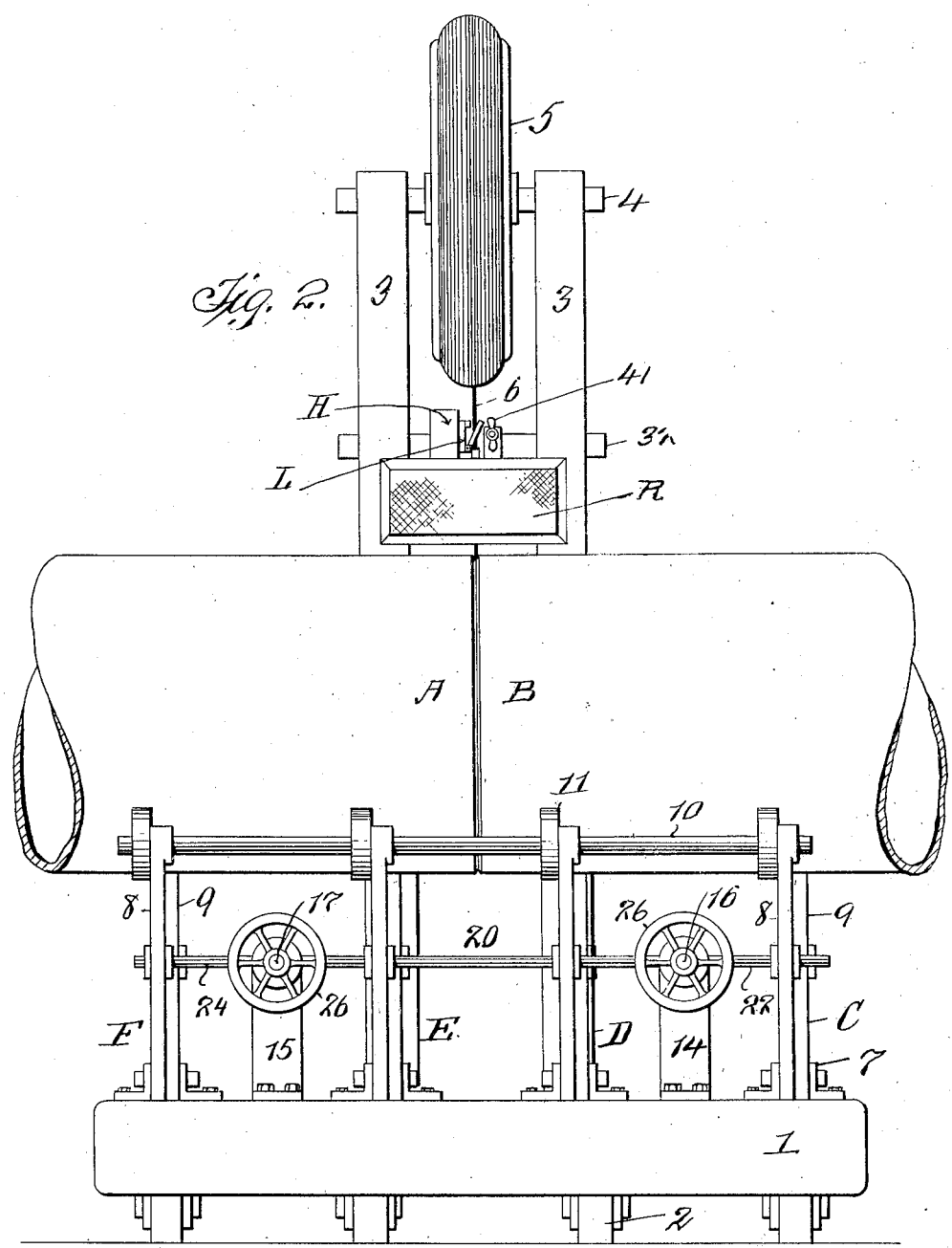
Figure 3:
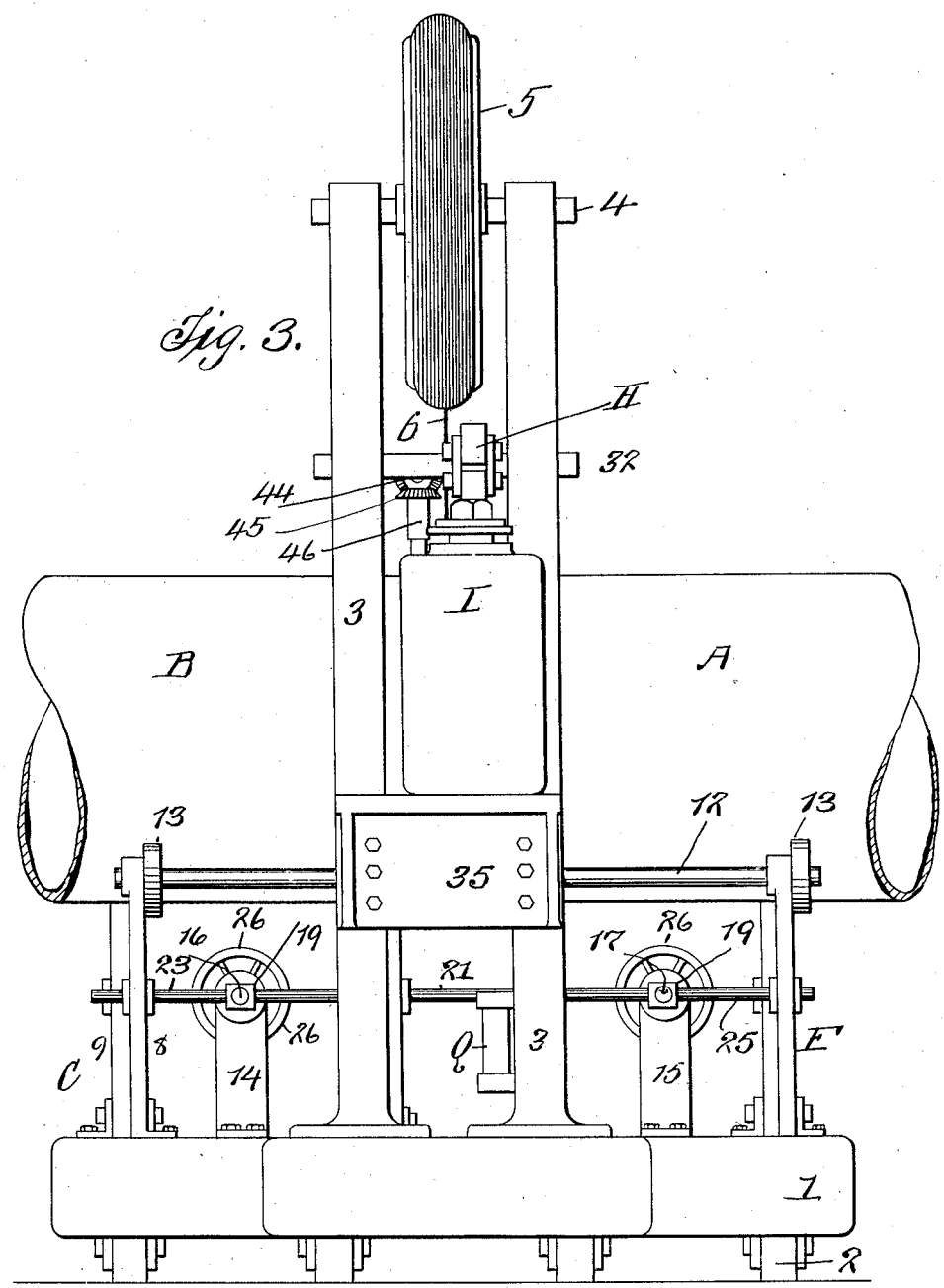
Figure 4:
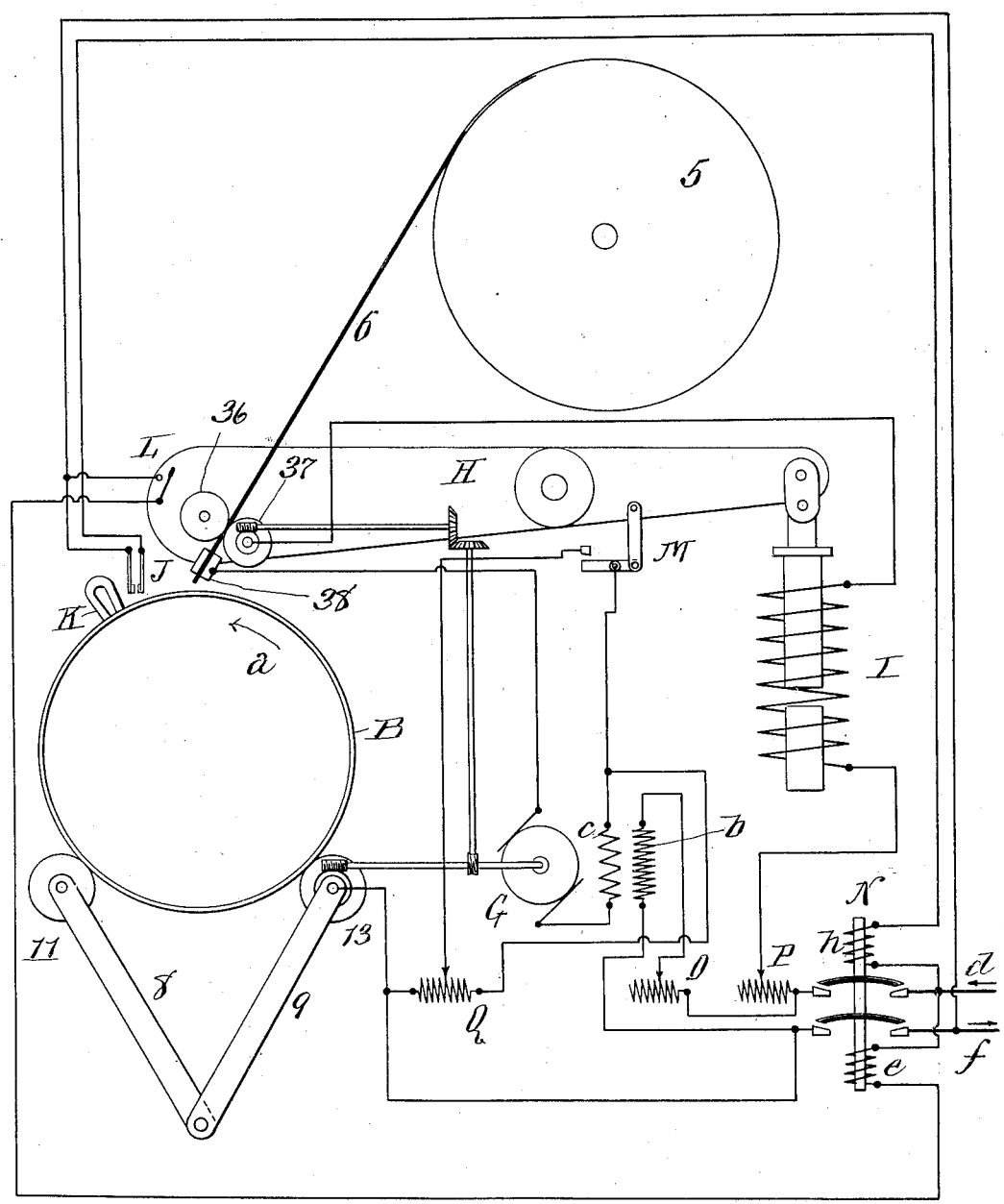
Figure 5:
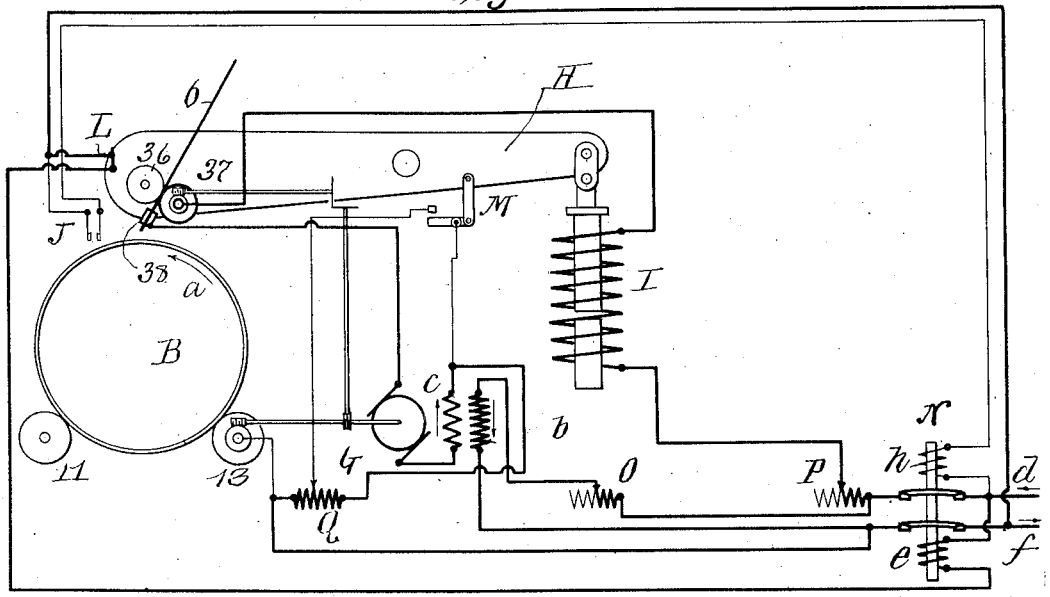

Fig. 1 is a side elevation of my electric arc welding machine, the electro-magnet and supporting bracket being in vertical section. In this figure the end pair C of pivoted roller supporting arms is omitted in order more clearly to show the reversely threaded shaft 16 and associated parts. Fig. 2 is a front elevation and Fig. 3 is a rear elevation of the machine. Fig. 4 is an electrical diagram, showing the circuits and parts of the machine when not in operation. Figs. 5, 6, 7 and 8 are electrical diagrams, showing the circuits established and positions of parts during successive stages of the operation of the machine.

Similar letters and numbers of reference indicate like parts.

The bed 1 of the machine is mounted on trucks 2 for convenience in transportation. Upon said bed are standards 3, 3, in which is journaled the transverse pin 4 which carries the freely rotatable reel 5, upon which is wound any desired length of welding wire 6. The reel is preferably made removable from the standards for purposes of refilling.

The work, as here shown, consists of the two metal cylinders A, B, which are to be arc welded together end to end. Said cylinders are supported and rotated as follows: Hinged in lugs 7 on bed 1 are four pairs C, D, E, F of longitudinally slotted arms 8, 9. A shaft 10 carrying rolls 11 extends through the front arms 8, and a shaft 12, Fig. 3, carrying rolls 13 extends through the rear arms 9 of said pairs. The work—as the cylinders A, B will hereafter for brevity be termed—rests upon the rolls 11 and 13.

By moving the front and rear arms of the pairs C, D, E, F nearer together or further apart, it is obvious that the work resting on rolls 11 and 13 can be raised or lowered. To move said arms simultaneously for this purpose, I provide the following mechanism: On bed 1 are two standards 14, 15. Through each standard freely passes a shaft 16, 17, an on each shaft is a right hand and a left hand screw thread—(see Fig. 1 in which for clearness the end pair C of arms 8, 9 has been omitted). Respectively on said threads are nuts 18, 19. The front nuts 18 are connected by a rod 20, Fig. 2, and the rear nuts 19 are connected by a rod 21, Fig. 3, said rods passing through longitudinal slots respectively in the front arms 8 and rear arms 9 of pairs D, E.

Through the similarly slotted arms of pair C extend rods 22, 23 which are connected to the nuts on screw shaft 16. From the similarly slotted arms of pair F extend rods 24, 25 which are connected to the nuts on shaft 17. On the screw shafts 16, 17 are hand wheels 26, by turning which in one direction or the other the nuts on said shafts are caused to move toward or away from one another, thus drawing together or separating the members of the pairs of arms C, D, E, F, and consequently the rolls 11, 12, thus raising or lowering the work A, B; or permitting the work support to be adjusted so as to allow work of greater or less diameter to be placed in the machine.

Because the cylindrical work rests upon the rolls 11, 13, said work may be rotated on its axis by positively driving either set of rolls (as here shown, the rear rolls 13 on shaft 12). This is done by the driving motor of the machine—here an electric motor G, Fig. 1, supported on a bracket on one of the standards 3. The motor shaft 27 is connected to an expansion joint 28, the movable member of which joint carries a universal joint 29, which in turn is connected to a worm shaft 30, which passes through a bracket on arm 9 of pair D, Fig. 1. The worm on shaft 30 engages pinion 31 on rear roll shaft 12. All of the rolls 13 being thus driven, in turn rotate the work A, B. The aforesaid flexible and length variable connection between the motor shaft and the pinion 31 allows of said rolls 13 being raised or lowered, as before described.

I will now describe the wire feeding mechanism. Extending through the standards 3, 3 is a shaft 32, on which is pivoted the arm H. To one end of said arm is connected by a link 33 the plunger core 34, Fig. 1, of an electro-magnet I, supported on bracket 35. On the side of said arm near the opposite end thereof are two feed rolls 36, 37 which receive between them the wire 6 from reel 5, the end of the wire passing through and protruding beyond a fixed guide 38. The feed roll 36 is pivoted on a swinging arm 39, which at its end receives a threaded bolt 40 fast on arm H. A wing nut 41 on said bolt moves arm 39 to press feed roll 36 against feed roll 37 in order that said rolls may tightly grasp the wire 6, and when actuated draw said wire from reel 5. The feeding of the wire is caused by the rotation of feed roll 37, which carries on its shaft a pinion 42 actuated by a worm on shaft 43, which is supported in brackets on arm H and has at its end a bevel pinion 44 engaging bevel pinion 45. Bevel pinion 45 is on a short shaft passing through bracket 46 on arm H and connected by universal joint 47 to the moving member of expansion joint 48, which in turn is connected by universal joint 49 to a short shaft passing through bracket 50 on standard 3. Said short shaft at its lower end carries a spiral gear 51 (dotted lines Fig. 1) which engages a spiral pinion 52 on the shaft of motor G. This flexible and length variable construction of the connection between bevel pinion 45 and said motor shaft permits of the swinging of arm H without disturbing the engagement of the driving gear of feed roll 37.

The electrical connections: Referring to the diagram Fig. 4, J (shown in Fig. 1 supported on arm H) is a spring switch normally open, but closed when, by reason of the rotation of the work in the direction of arrow $a$, a projection K, which is here a permanent magnet in horseshoe form, adherent to the work and manually applied thereto at a particular moment, as hereinafter explained, contacts with said switch. L is a manually controlled switch on arm H. M is a switch connected by a link to arm H, which closes circuit when the right hand end of said arm is drawn down by electro-magnet I. N is the main supply switch communicating with the source of current (not shown) by leads $d, f$. O, P, and Q are variable resistances. The motor G is of the differential compound wound type, the shunt field $b$ receiving its supply across the potential from supply switch N, through the variable resistance O. The series field $c$ is connected in reverse to the shunt field $b$, as indicated by the arrows in Fig. 5.

Figure 6:
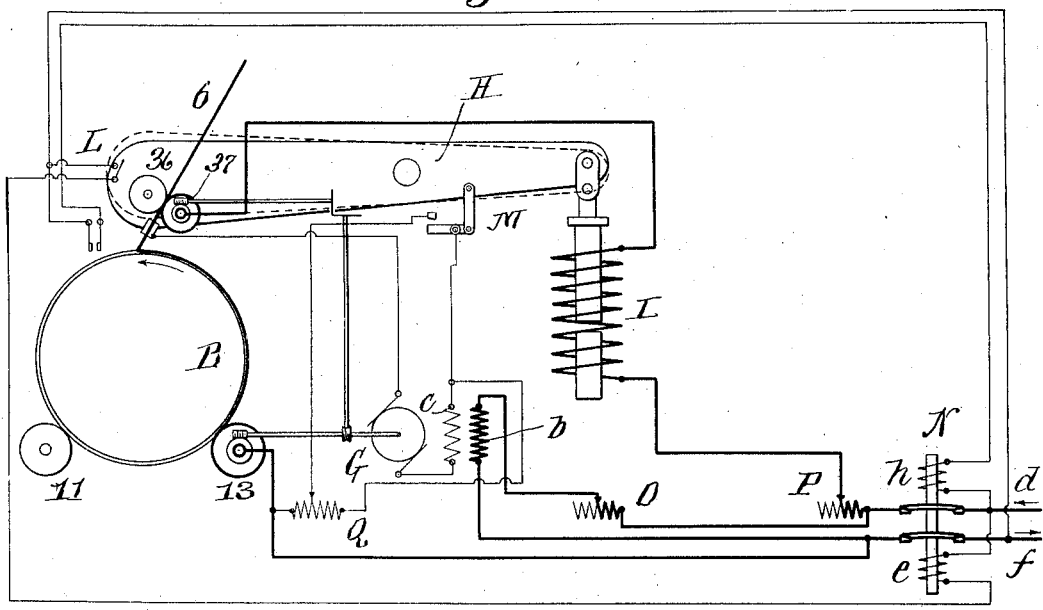

The operation is as follows, the live circuits being in Figs. 5, 6, 7, 8 indicated by heavy lines: The switch L is manually closed. The circuits established are then as in Fig. 5. The entering supply current from main lead $d$ passes through the lower coil $e$ of switch N, energizing said coil, which closes said switch N, and so to closed switch L and to main lead $f$. Switch N being closed, the current divides as follows: Part proceeds through a portion of variable resistance P to electro-magnet I, to feed roll 37, to wire 6 and guide 38, thence to the brushes of motor G, to series field $c$, through all of variable resistance Q, and so back to switch N and main lead $f$. Another part proceeds to a part of variable resistance O, to shunt field $b$, and so back to switch N and main lead $f$. These circuits being established and switch N closed, switch L may be opened and so left. The current through series field $c$ and resistance Q is not sufficient to energize electro-magnet I, but is sufficient to start motor G. As soon as the motor G starts, the wire 6 will gradually be fed forward by the feed rolls 36, 37 until its end makes contact with the work, as shown in Fig. 6. At this instant, and for an instant only, a short circuit will be formed from the end of wire 6, through the work (indicated by the dark line on the right hand side of the work, in Fig. 6) to roll 13, and so to switch N and lead $f$. Because of this short circuiting of resistance Q, field $c$ and the motor, a comparatively heavy current will at once pass to electromagnet I, which will draw down the right hand end of arm H, as indicated by the dotted lines in Fig. 6. The period of time in which this short circuiting and the tilting of arm H takes place is infinitesimal, so that the motor does not stop, but continues rotating by inertia. As the arm H tilts it moves the end of the wire 6 away from the work, and the welding arc is at once struck between said end and the work, as indicated at $g$ in Fig. 7. The first-named feature of the welding operation, namely, the striking of the welding arc, is thus accomplished.

Figure 7:
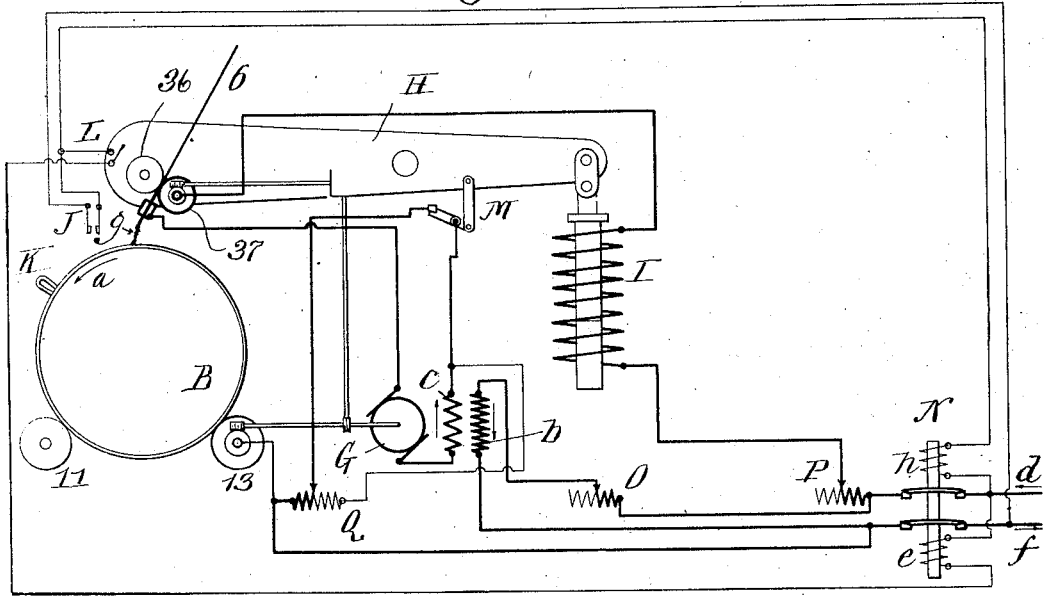

The tilting of arm H also closes switch M. The resulting circuits, as shown in Fig. 7, are then as follows: From main lead $d$, to switch N, through a portion of variable resistance P, electro-magnet I, feed roll 37, motor G, series field $c$, switch M, a portion of variable resistance Q, and so to switch N and main lead $f$. As the current in the shunt field and series field of the motor are now in opposite directions (see arrows Fig. 7), the motor will operate at a speed corresponding to the power differential of the fields and becomes very sensitive. That is, the slightest change in the struck arc voltage will affect its speed, which in turn will govern the speed of both the wire feeding and the work rotating rolls. Previous to the welding operation, the motor circuit energy consumption, through the variable resistances O, P, Q is exactly adjusted to give the proper amount of current to melt the welding wire 6, and once set will always maintain the balance for a certain size of work and welding wire. Consequently after the arc has been struck and the feeding and work rotating mechanism started as described, continuity of the weld is not impaired by any other factor than the current supply, length of feed wire and the length of the welded joint formed between the abutting ends of the cylinders A, B. In this way the second feature of the arc welding operation, namely, uniform feeding of the welding wire and a steady progress of the weld, is accomplished.

Figure 8:
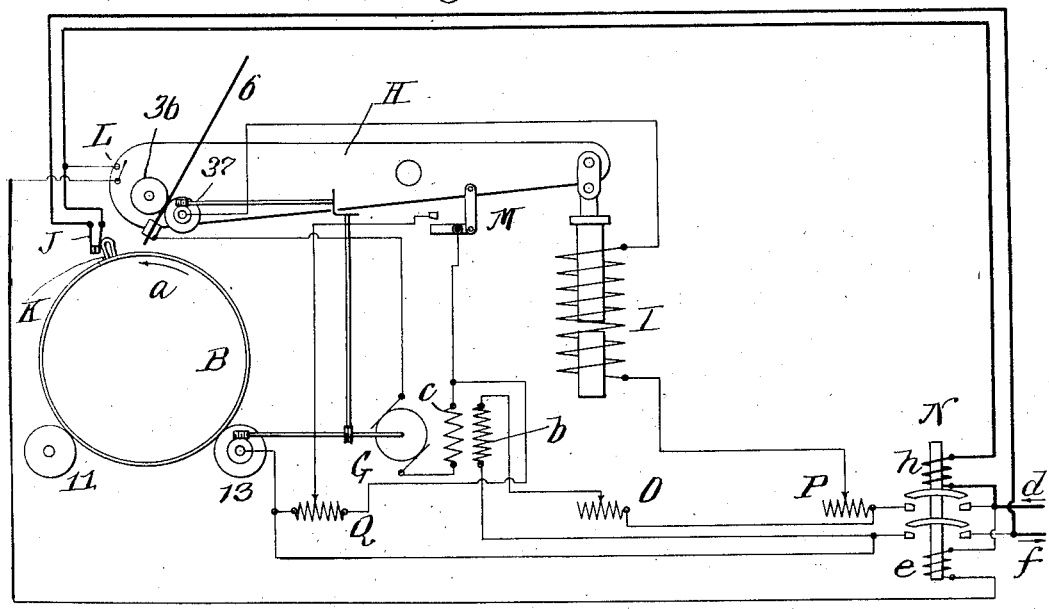

Returning once more to Fig. 7, after the arc is struck, and consequently after the weld has begun, the operator applies to the work a small horse-shoe-shaped permanent magnet K, so that by its own attraction its polar ends will adhere to said work. The position of this magnet is to be such that after the work has completed its rotation and the weld is finished, the projecting body of the magnet will meet and close the switch J, as shown in Fig. 8. Circuit is thus closed through the upper coil $h$ of supply switch N, whereby said switch is opened and the whole machine stopped, the parts resuming their initial position shown in Fig. 4. The third main feature of the welding operation, namely, the stopping of the arc, is thus accomplished. The completed work is then removed. The adjustable resistance P in the electric supply circuit allows of a general adjustment of the welding current in case wires of different cross sectional areas are used, in which event different amounts of electric energy will be required.

In order to protect the eyes of the operator, an eye shield R, Fig. 2, of smoked glass or the like may be secured upon the arm H, in front of the arc $g$.

I claim:

1. An arc welding machine, comprising means for rotating the work, a fusible electrode, and mechanism for continuously feeding said fusible electrode to the welding joint, the said rotating means comprising two groups of work supporting rolls, and means for driving one of said groups.

2. An arc welding machine, comprising a bed, a plurality of pairs of arms, the members of each pair being hinged to said bed, two shafts respectively carried by corresponding members of said pairs, and work supporting rolls on said shafts.

3. An arc welding machine, as in claim 2, further including means for varying the distance of corresponding members of each pair of arms from their opposite members.

4. An arc welding machine, as in claim 2, further including a fixed standard on said bed, a shaft having right and left hand screw threads supported in said standard, nuts on said shaft respectively engaging said right and left hand threads, and means for connecting said nuts respectively to corresponding members of said pairs of arms.

5. An arc welding machine, comprising an electric motor, a switch in circuit therewith, mechanism actuated by said motor for moving the work in the direction of the welding joint, a fusible electrode, mechanism actuated by said motor for feeding said fusible electrode to said joint, means operated by said moving work for opening said switch to break circuit to said motor after a predetermined length of said fusible electrode has been fed to said work.

6. An arc welding machine, as in claim 5, the said switch operating means being a permanent magnet manually placed in predetermined position on said work and magnetically adherent thereto.

7. An arc welding machine, comprising means for moving the work in the direction of the welding joint, an electrode in contact with said joint, a fusible electrode, means for feeding said fusible electrode, a motor of the differential compound wound type actuating said work-moving and said feeding means, and circuit connections substantially as set forth; whereby changes in the struck arc voltage will affect the speed of the motor and in turn the speed of said work-moving and feeding means.

8. An arc welding machine, comprising means for moving the work in the direction of the welding joint, an electrode in contact with said work, a movable support and carried thereby a fusible electrode and feeding means for said electrode, an electro-magnet controlling the movement of said support, a switch operated by said support, a motor, and circuit connections substantially as set forth; whereby upon the closing of circuit said motor shall be actuated to cause said feeding means to bring said fusible electrode into contact with the work, then momentarily short-circuited and said electro-magnet energized to actuate said support to carry the fusible electrode away from the work and so strike the welding arc, and through said switch to reestablish circuit to said motor to cause the continued movement of the work and feeding of the fusible electrode.

9. The combination of a work support and a welding electrode holder, said parts being relatively movable to cause an electrode in said holder to traverse a closed path with reference to said work support, and means for discontinuing the welding operation when the said path has been traversed by the electrode.

10. In apparatus of the class described the combination of a rotatable work support, electrode holding means adapted to maintain an electrode in suitable relation to said work support and means for discontinuing the rotation of the work support after a predetermined rotative movement.

11. In apparatus of the class described the combination of a rotatable work support, an electrode holder, and means operative after a predetermined movement of the work support to interrupt the current to the electrode.

12. In apparatus of the class described, the combination of a rotatable work support an electrode holder, and means operative after a predetermined movement of the work support to discontinue the rotation thereof and to interrupt the current to the electrode.

In testimony whereof I have affixed my signature.

HARRY R. WOODROW.